United States Patent
Chen

(10) Patent No.: US 9,052,517 B2
(45) Date of Patent: Jun. 9, 2015

(54) AUTOSTEREOSCOPIC DISPLAY DEVICE BASED ON PARALLAX BARRIER

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/164,124

(22) Filed: Jan. 24, 2014

(65) Prior Publication Data

US 2014/0376074 A1    Dec. 25, 2014

(30) Foreign Application Priority Data

Jun. 25, 2013    (TW) .............................. 102122608 U

(51) Int. Cl.
*G02B 27/22* (2006.01)
*G02F 1/15* (2006.01)
*G02F 1/153* (2006.01)

(52) U.S. Cl.
CPC ............ *G02B 27/2214* (2013.01); *G02F 1/153* (2013.01)

(58) Field of Classification Search
CPC ...... G02B 27/2214; G02F 1/153; G02F 1/157
See application file for complete search history.

(56) References Cited

U.S. PATENT DOCUMENTS

| | | | | |
|---|---|---|---|---|
| 8,115,985 B2 * | 2/2012 | Liu | ............................... | 359/273 |
| 8,427,734 B2 * | 4/2013 | Yeh et al. | ...................... | 359/270 |
| 8,436,787 B2 * | 5/2013 | Chen et al. | ........................ | 345/6 |
| 8,446,460 B2 * | 5/2013 | Chang | ............................. | 348/51 |
| 8,520,287 B2 * | 8/2013 | Lee et al. | ...................... | 359/273 |
| 8,759,164 B2 * | 6/2014 | Hsu | ............................... | 438/141 |
| 2012/0170115 A1 * | 7/2012 | Zhang et al. | ................... | 359/465 |

* cited by examiner

*Primary Examiner* — David N Spector
(74) *Attorney, Agent, or Firm* — Novak Druce Connolly Bove + Quigg LLP

(57) ABSTRACT

An autostereoscopic display device includes a display, a parallax barrier, a driver and a controller. The parallax barrier is placed in front of the display and includes a matrix of barrier blocks. The driver is electrically connected to the parallax barrier. The controller is in communication with the driver and controls the driver such that the barrier block in the i-th line and j-th column is switched on to a transparent state and the other barrier blocks are switched off to a nontransparent state, where i and j satisfy the following condition formulae: j=i+nk, i≤N, and j≤M, i and j are positive integers, n is an integer, k is a positive integer constant, N is the number of the lines of the barrier blocks, and M is the number of the columns of the barrier blocks.

12 Claims, 3 Drawing Sheets

AUTOSTEREOSCOPIC DISPLAY DEVICE BASED ON PARALLAX BARRIER

BACKGROUND

1. Technical Field

The present disclosure relates to autostereoscopic display technologies and, particularly, to an autostereoscopic display device employing a parallax barrier.

2. Description of Related Art

Autostereoscopic display can be realized by a parallax barrier method, in which a parallax barrier is positioned in front of a display to render dual parallax, of which a stereoscopic effect is often less than satisfactory.

Therefore, it is desirable to provide an autostereoscopic display device, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
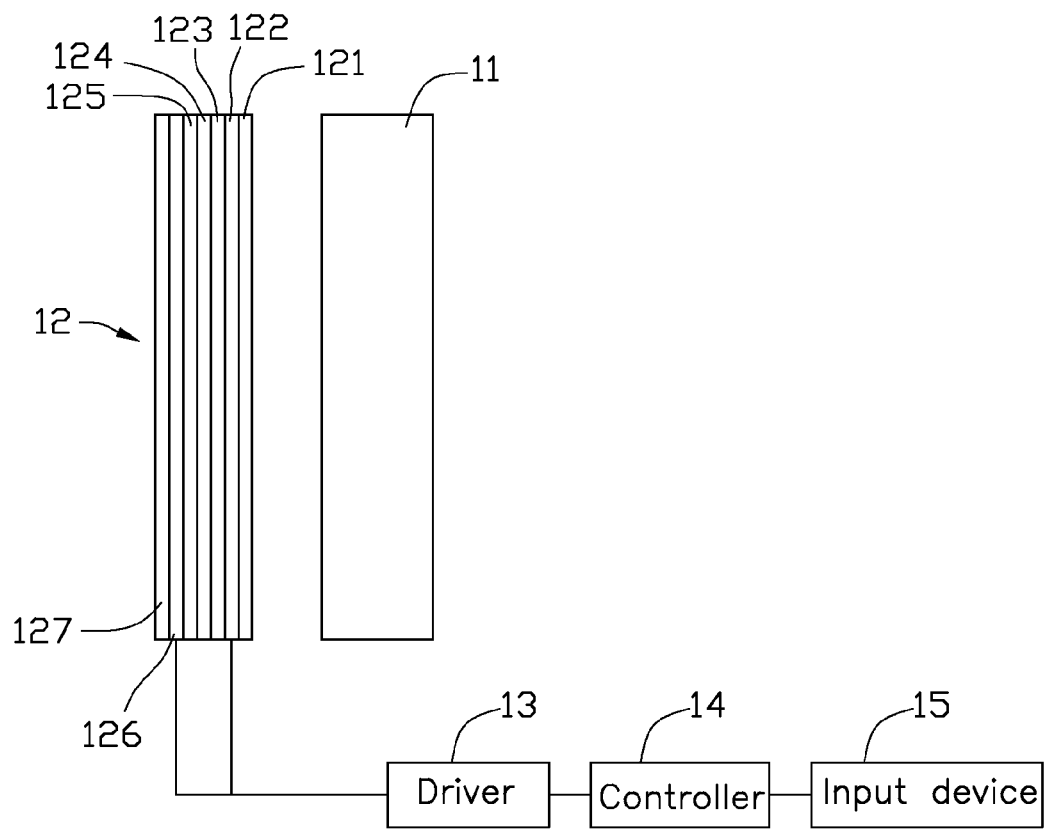
FIG. 1 is a functional block diagram of an autostereoscopic display device according to an embodiment.

FIG. 1 shows an autostereoscopic display device 10 includes a display 11, a parallax barrier 12 positioned in front of the display 11, a driver 13 electrically connected to the parallax barrier 12, and a controller 14 in communication with the driver 13.

Figure 2:
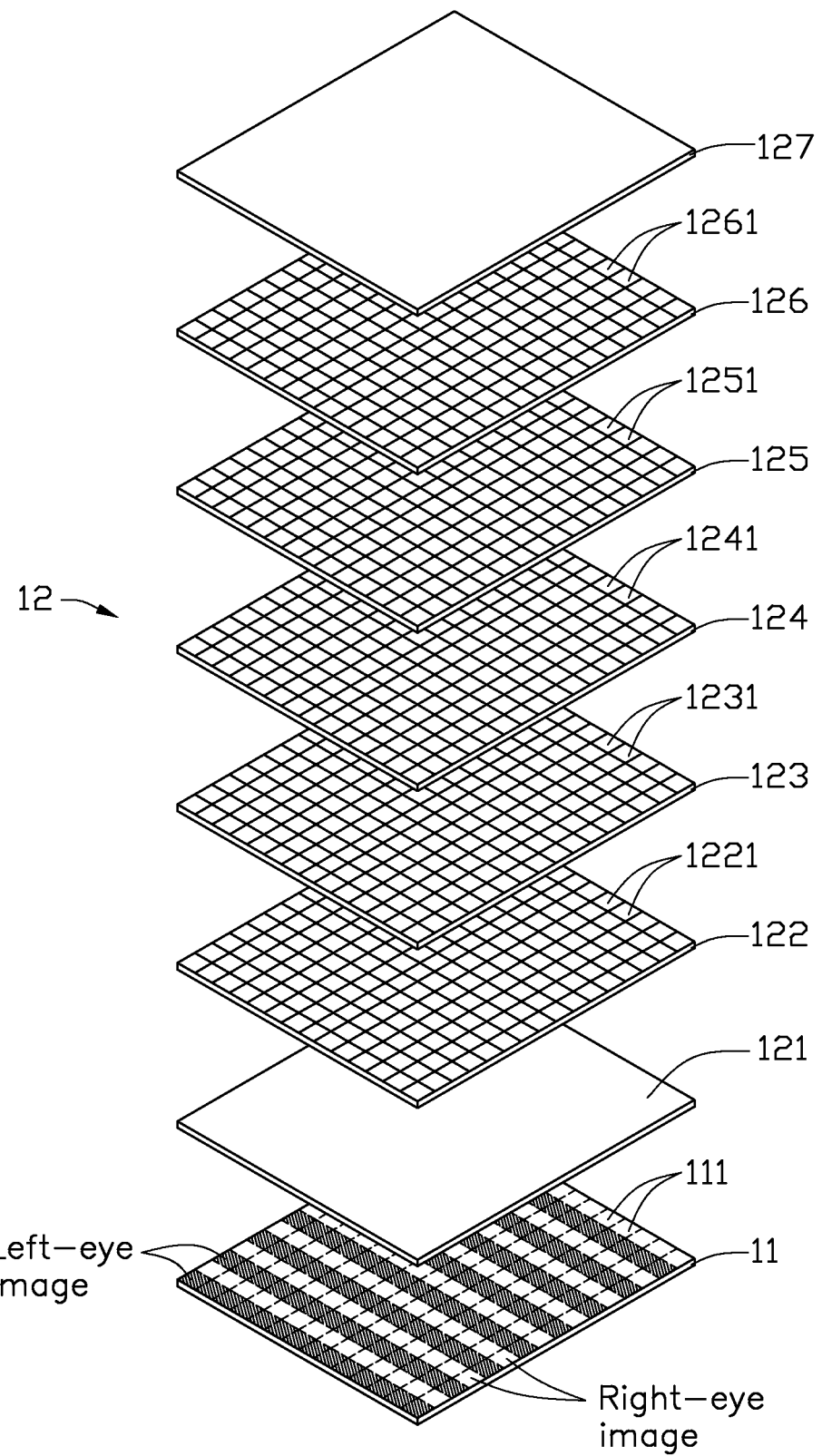
FIG. 2 is an isometric view of a display and a parallax barrier of the autostereoscopic display device of FIG. 1.

FIG. 2 shows that the display 11 can be but is not limited to a liquid crystal display, a field emission display, and an organic light emitting diode display. The display 11 includes a matrix of pixels 111. The display 11 simultaneously displays a left-eye image on alternative columns of pixels 111 and a right-eye image on the other columns of pixels.

The parallax barrier 12 includes a first transparent substrate 121, a first conductive layer 122, an electrochromic layer 123, an electrolytic layer 124, an ion storage layer 125, a second conductive layer 126, and a second transparent substrate 127, orderly stacked above the display 11.

The first transparent substrate 121 and the second transparent 127 can be made of glass or plastic and seals and protects the first conductive layer 122, the electrochromic layer 123, the electrolytic layer 124, the ion storage layer 125, and the second conductive layer 126 from being damaged.

The first conductive layer 122 is positioned on the first transparent substrate 121 and includes a number of first conductive blocks 1221 arranged in a matrix and electrically separated from each other. The first conductive layer 122 is formed by screen printing using transparent conductive ink, or depositing using conductive plastic or indium tin oxide.

The electrochromic layer 123 is positioned on the first conductive layer 122 and includes a number of electrochromic blocks 1231 arranged in a matrix. The electrochromic layer 122 is formed by screen printing using electrochromic ink.

The electrolytic layer 124 is positioned on the electrochromic layer 123 and includes a number of electrolytic blocks 1241 arranged in a matrix. The electrolytic layer 124 is formed by screen printing using electrolytic ink.

The ion storage layer 125 is positioned on the electrolytic layer 124 and includes a number of ion storage blocks 1251 arranged in a matrix. The ion storage layer 125 is formed by screen printing using electrolytic ink.

The second conductive layer 126 is positioned on the ion storage layer 125 and includes a number of second conductive blocks 1261 arranged in a matrix and electrically separated from each other. The second conductive layer 126 is formed by screen printing using transparent conductive ink, or depositing using conductive plastic or indium tin oxide.

Figure 3:
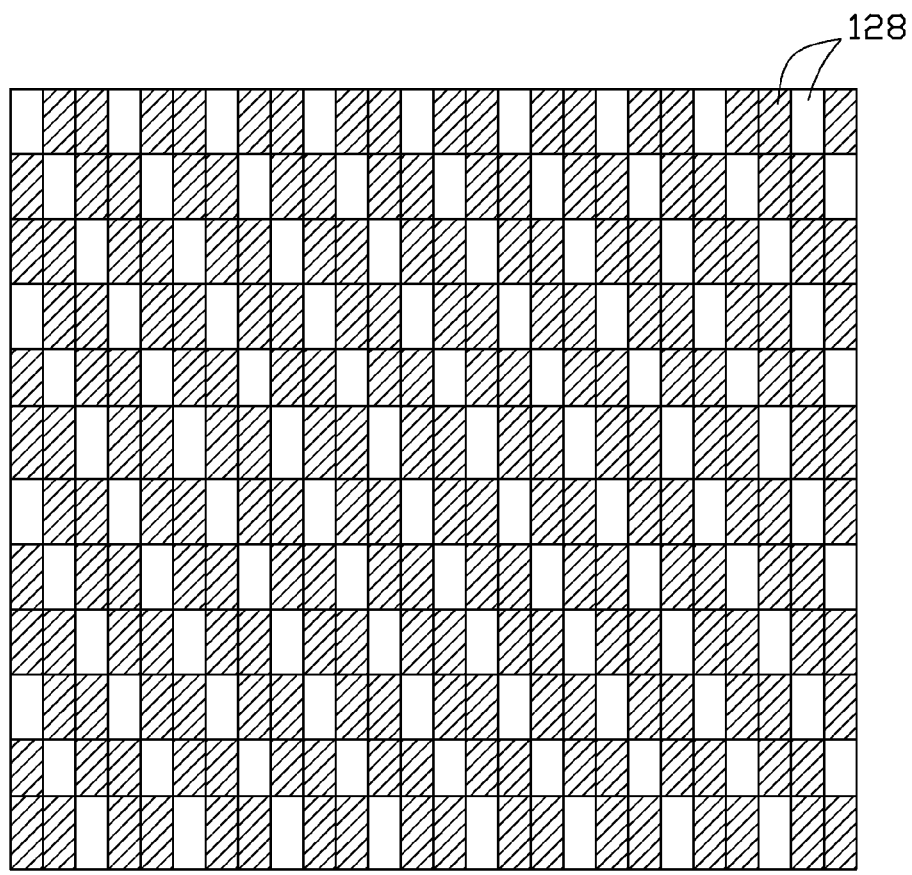
FIG. 3 is a planar view showing how the parallax barrier of FIG. 2 works.

FIG. 3 shows that each first conductive block 1221 is substantially identical with one of the electrochromic blocks 1231, the electrolytic blocks 1241, the ion storage blocks 1251, the second conductive blocks 1261 in shape, size, and position. As such, each first conductive block 1221, electrochromic blocks 1231, electrolytic blocks 1241, ion storage blocks 1251, and second conductive blocks 1261 cooperatively form a barrier block 128, of which a length and width is smaller than two times of a length and width of the pixel 111, respectively.

In one embodiment, the length and width of the barrier block 128 is substantially identical to the length and width of the pixel 111, respectively, each barrier block 128 is aligned with the corresponding pixel 111.

In alternative embodiments, the electrochromic layer 123, the electrolytic layer 124, and the ion storage layer 125 can be integrally formed as one-piece as the electrochromic blocks 1231, the electrolytic blocks 1241, and the ion storage blocks 1251 are not required to be electrically separated from each other. Each first conductive block 1221 and second conductive block 1261 form the barrier block 128 cooperating with portions of the electrochromic layer 123, the electrolytic 124, and the ion storage layer 125 corresponding to the first conductive block 1221 and the second conductive block 1261 in shape, size, and position.

The driver 13 switches on and off each barrier block 128. In particular, the driver 113 selectively applies a voltage to each first conductive block 1221 and second conductive block 1261 to cause that the corresponding electrolytic block 1241 (or the corresponding portion of the electrolytic layer 124) ionizes and provides ions to the corresponding electrochromic block 1231 (or the corresponding portion of the electrochromic layer 123) such that the electrochromic block 1231 occurs an oxidization reaction to a transparent state (i.e., switching on) or occurs an reduction reaction to a nontransparent state (i.e., switching off). The corresponding ion storage block 1251 stores ions that are opposite to the ions in the corresponding electrochromic block 1231 to neutralize the barrier block 128.

The controller 14 controls the driver 13 such that the barrier block 128 in the i-th line and j-th column is switched on and the other barrier blocks 128 are switched off, where i and j satisfy the following condition formulae: $j=i+nk$, $i \leq N$, and $j \leq M$, i and j are positive integers, n is an integer, k is a positive integer constant, N is the number of the lines of the barrier blocks 128, and M is the number of the columns of barrier blocks 128.

As such, the parallax barrier 12 is a slit grating, wherein the slits are tilted. A ratio of the barrier blocks 128 that is turned on to the barrier blocks 128 that is turned off is $1:(k-1)$, that is the parallax barrier 12 can render k-parallax. Thus, by setting k, a desired k-parallax can be achieved to increase a stereoscopic effect of the autostereoscopic display device 10.

The autostereoscopic device 10 can also includes an input device 15 for receiving user input. The controller 14 activates the parallax barrier 12 or not depending on the user input. The parallax barrier 12 is totally transparent when inactivated. As such, the autostereoscopic display device 10 can display 2D images. In this case, as no light is blocked by the parallax barrier 12, an illumination of the autostereoscopic display device 10 is increased.

The controller 14 also determines a value of k based on the user input.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. An autostereoscopic display device, comprising:
   a display;
   a parallax barrier placed in front of the display and comprising a matrix of barrier blocks;
   a driver electrically connected to the parallax barrier; and
   a controller in communication with the driver and configured for controlling the driver such that the barrier block in the i-th line and j-th column is switched on to a transparent state and the other barrier blocks are switched off to a nontransparent state, where i and j satisfy the following condition formulae: $j=i+nk$, $i \leq N$, and $j \leq M$, i and j are positive integers, n is an integer, k is a positive integer constant, N is the number of the lines of the barrier blocks, and M is the number of the columns of barrier blocks.

2. The autostereoscopic display device of claim 1, wherein the display comprises a matrix of pixels, and a length and width of the barrier block is smaller than two times of a length and width of the pixel, respectively.

3. The autostereoscopic display device of claim 1, wherein the display comprises a matrix of pixels, a length and width of the barrier block is substantially identical to a length and width of the pixel, respectively, and each barrier block is aligned with the corresponding pixel.

4. The autostereoscopic display device of claim 1, further comprising an input device for receiving user input, the controller being configured for activating the parallax barrier depending on the user input, the parallax barrier being totally transparent when inactivated.

5. The autostereoscopic display device of claim 4, wherein the controller is configured for determining a value of k based on the user input.

6. The autostereoscopic display device of claim 1, wherein the parallax barrier comprises a first transparent substrate, a first conductive layer, an electrochromic layer, an electrolytic layer, an ion storage layer, a second conductive layer, and a second transparent substrate, orderly stacked above the display, the first conductive layer comprises a matrix of first conductive blocks electrically separating from each other, the second conductive layer comprises a matrix of second conductive blocks electrically separating from each other, and each first conductive block and each second conductive bock form one of the barrier blocks cooperating with corresponding portions of the electrochromic layer, the electrolytic layer, and the ion storage layer.

7. The autostereoscopic display device of claim 6, wherein the first transparent substrate and the second transparent are made of glass or plastic and seals and configured for protecting the first conductive layer, the electrochromic layer, the electrolytic layer, the ion storage layer, and the second conductive layer from being damaged.

8. The autostereoscopic display device of claim 6, wherein the first conductive layer and the second conductive layer are positioned on the first transparent substrate and the second transparent substrate respectively and are formed by screen printing using transparent conductive ink, or depositing using conductive plastic or indium tin oxide.

9. The autostereoscopic display device of claim 6, wherein the electrochromic layer is formed by screen printing using electrochromic ink.

10. The autostereoscopic display device of claim 6, wherein the electrolytic layer is formed by screen printing using electrolytic ink.

11. The autostereoscopic display device of claim 6, wherein the ion storage layer is formed by screen printing using electrolytic ink.

12. The autostereoscopic display device of claim 6, wherein the electrochromic layer comprises a matrix of electrochromic blocks, the electrolytic layer comprises electrolytic blocks, the ion storage layer comprises ion storage blocks, each first conductive block is substantially identical with one of the electrochromic blocks, the electrolytic blocks, the ion storage blocks, the second conductive blocks in shape, size, and position, and cooperatively form one of the barrier blocks.

* * * * *